(12) United States Patent
Bach et al.

(10) Patent No.: US 9,959,263 B2
(45) Date of Patent: May 1, 2018

(54) USER INTERFACE FORM FIELD EXPANSION

(75) Inventors: Michael Bach, Seattle, WA (US); Simon Tan, Bellevue, WA (US); Vishal Joshi, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 910 days.

(21) Appl. No.: 12/962,644

(22) Filed: Dec. 7, 2010

(65) Prior Publication Data

US 2012/0144285 A1    Jun. 7, 2012

(51) Int. Cl.
| | | |
|---|---|---|
| *G06F 17/00* | (2006.01) | |
| *G06F 17/24* | (2006.01) | |
| G06F 17/22 | (2006.01) | |
| G06F 3/0481 | (2013.01) | |
| G06F 9/44 | (2018.01) | |
| G06F 3/0482 | (2013.01) | |
| G06F 17/27 | (2006.01) | |
| G06F 17/30 | (2006.01) | |

(52) U.S. Cl.
CPC .......... *G06F 17/243* (2013.01); *G06F 17/246* (2013.01); *G06F 3/0481* (2013.01); *G06F 3/0482* (2013.01); *G06F 8/34* (2013.01); *G06F 8/38* (2013.01); *G06F 9/4443* (2013.01); *G06F 17/2247* (2013.01); *G06F 17/247* (2013.01); *G06F 17/2725* (2013.01); *G06F 17/30* (2013.01)

(58) Field of Classification Search
CPC .... G06F 17/243; G06F 17/246; G06F 17/247; G06F 17/2247; G06F 17/2725; G06F 17/30; G06F 17/4443; G06F 8/38; G06F 8/0482; G06F 9/4446; G06F 9/4443; G06G 3/0481
USPC .......................... 715/221–226, 273, 762–763
See application file for complete search history.

(56) References Cited

U.S. PATENT DOCUMENTS

| | | | |
|---|---|---|---|
| 6,084,585 A | | 7/2000 | Reiner et al. |
| 6,137,488 A | * | 10/2000 | Kraft et al. .................... 715/866 |
| 6,589,290 B1 | * | 7/2003 | Maxwell et al. ............. 715/224 |
| 6,968,500 B2 | | 11/2005 | Mikhailov |
| 2004/0268229 A1 | * | 12/2004 | Paoli ..................... G06F 17/243 715/200 |
| 2006/0106783 A1 | * | 5/2006 | Saffer et al. ..................... 707/3 |
| 2007/0266328 A1 | * | 11/2007 | Vasey ........................... 715/762 |
| 2009/0044103 A1 | * | 2/2009 | Chalecki et al. ............. 715/234 |

(Continued)

OTHER PUBLICATIONS

Andreas Girgensohn "Dynamic Forms: An Enhanced Interaction Abstraction Based on Forms", Published Date: Sep. 10, 2010, 6 pages.

(Continued)

*Primary Examiner* — Quoc A Tran

(57) ABSTRACT

The subject disclosure relates to configurable multi-view data entry. When a user encounters a form field with a complex data type, depending on the invoking mechanism, either automatic when on focus, or through a user gesture such as clicking on an icon in the form field, the form field expands to multiple form fields including the original form field. The multiple form fields can allow the user to enter in each separate data item that makes up the complex data type. As data items are entered, the data items can be combined into a correct format and displayed in the original form field.

18 Claims, 13 Drawing Sheets

(56) References Cited

U.S. PATENT DOCUMENTS

2009/0204881 A1* 8/2009 Murthy et al. ............... 715/226
2012/0159300 A1* 6/2012 Vincent, III ........ G06F 17/2247
  715/222

OTHER PUBLICATIONS

Sidney L. Smith, et al. "Data Entry", Published Date: Sep. 10, 2010; 88 Pages; http://hcibib.org/sam/1.html.
Alfons Brandl, et al. "FormGen: A Generator for Adaptive Forms Based on EasyGUI", Published Date: Feb. 21, 2007, 5 Pages.
"Chapter 5: Constructing User Interfaces", Published Date: Mar. 2006; 10 Pages; http://msdn.microsoft.com/en-us/library/aa730862(VS.80,printer).aspx.
"Working with Complex Data Types", Published Date: May 2010; 1 Page; http://msdn.microsoft.com/en-us/library/ff407509(printer).aspx.

* cited by examiner

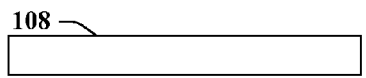

PHASE 1: UI 106 presents form field 108 associated with a compound data type

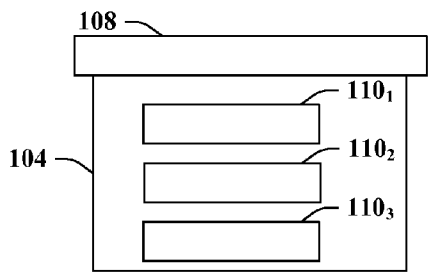

PHASE 2: Either automatically or based on invoking input 116, either one or both potentially in connection with setting 118 or inference 120, expander component 102 displays input window 104

> Input window 104 includes multiple constituent fields 110, that combine to yield compound data expected in form field 108

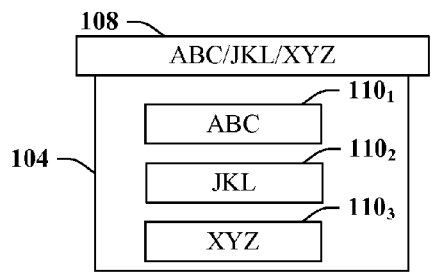

PHASE 3: As data entry input 114 is received at either form field 108 or constituent fields 110, synthesis component 112 displays in real-time correctly formatted inline updates

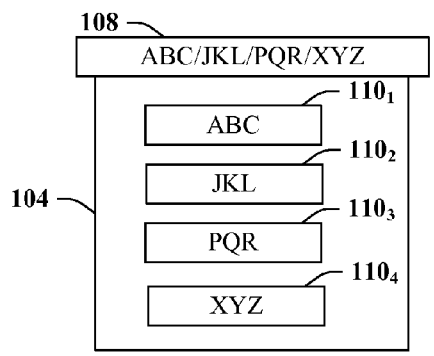

PHASE 4: (Optional) Data entry input 114 provided to form field 108 (e.g., by an experienced user) can include information not listed in default or standard displays of input window 104, which can be parsed and result in display of additional constituent fields 110.

PHASE 5: (Optional) expander component 102 removes or hides input window 104 resulting in a less cluttered UI 106

FIG. 3

Publish

First time publishing? Add existing server information below or find a web host.

◉ Remote Server

Web Site: [e.g., www.name.com]

Server: [e.g., server1.adhost.com] ●

Username: [          ]

Password: [          ]

◉ Databases

● *Repopulate*

● MyWebsiteDB | Publish by Copying ▽ | ┆ Connection String ● ┆
                                                                    602

● SomeSuperLo... | Publish to SQL Ser. ▽ | Connection String ●

[ Publish Files - Databases ▽ ]  [ Cancel ]  [ Apply ]

Publish

First time publishing? Add existing server information below or find a web host.

◉ Remote Server

Web Site: [e.g., www.name.com]

Server: [e.g.,server1.adhost.co]

Username: [                    ]

Password: [                    ]

— 504

[Datasource]

[Catalog]

[Username]

[Password]

[Integrated Security Type]

[Provider]

[Trusted Connection ▽]

◉ Databases

☐ Repopulate

☐ MyWebsiteDB | Publish by Copying ▽ | Connection String ●
— 602

☐ SomeSuperLo... | Publish to SQL Ser. ▽ | Connection String ●

[Publish Files - Databases ▽]  [Cancel]  [Apply]

Publish

First time publishing? Add existing server information below or find a web host.

◉ Remote Server

504

Web Site: [e.g., www.name.com]

| MyServer |

Server: [e.g., server1.adhost.co]

| MyDataBase |

Username: [          ]

| Username001 |

Password: [          ]

| **************** |

| SSPI |

| SQLServer |

| Yes ▽ |

◉ Databases

☐ • ~~Repopulate~~

☐ • MyWebsiteDB | Publish by Copying ▽ | Data Source = MyServer.. • |
                                                 └─ 602

☐ • SomeSuperLo... | Publish to SQL Ser. ▽ | Connection String • |

[ Publish Files - Databases ▽ ]   [ Cancel ]   [ Apply ]

FIG. 8

USER INTERFACE FORM FIELD EXPANSION

TECHNICAL FIELD

The subject disclosure relates to form field expansion and related features for user interfaces in connection with complex or compound data types.

BACKGROUND

Today, there is constant demand for data entry, particularly with the use of form fields, such as a designated box on a user interface (UI), that expect a particular type of data, often formatted a particular way. In scenarios in which the form field expects a complex data type and/or format that is a composite of multiple individual data elements, the data entered into the form field is often input according to a predefined scheme that satisfies certain data parameters such as database storage or access requirements. As such, a number of difficulties can arise.

For instance, form fields that require a complex data format can be unfamiliar to novice users, even if experienced users are familiar and have little trouble entering the correct data elements in the correct format. Accordingly, when presented with a form field that expects a complex data format, the novice user will often be unable to correctly enter the expected data without time-consuming delays from failed attempts or from consulting information sources such as written manuals or advice from expert users.

For example, consider shipping software for an ecommerce business that expects address information of the purchaser to be input in a particular format, such as name/street address/optional apartment code/city/zip code/state, where each individual data element is delimited by "/". As other examples, consider phone number formats by country or a connection string for an application to connect to a data source (e.g., web server), the correctly formatted input of which can be similar to the following: "Data Source=myServerAddress;Initial Catalog=myDataBase; User Id=myUsername;Password=myPassword;". In the case of the shipping software scenario, it can be readily observed that experienced users might recall how to enter data into the shipping software form field, with or without an apartment code, and even for overseas addresses or for addresses that are atypical such as military bases or the like. Likewise, in the connection string example, an experienced user might recall the exact individual elements and order and be able to type that in quickly, or cut and paste the correct information from another record. On the other hand, the novice user can struggle in both scenarios.

Conventional solutions address this difficulty in one of two ways and are inadequate. For instance, an example will be shown somewhere on the UI for entering data into the form field. However, in many scenarios, the proper format for entering data depends upon a variety of factors. Therefore, examples can be of little or no value to the novice user or even harmful if the examples lead the user astray. For example, consider a Web Service endpoint or Representation State Transfer (REST)ful Uniform Resource Locators (URLs). In this scenario, URLs are formatted differently depending upon the fundamental protocol a user chooses. Hence, the URL can in one case be, e.g., "http://foo.com/bar.axd" while in another case the URL can be "https://foo: 8748/bar.axd". In other cases the URL might be directed to file transfer protocol (FTP), and therefore begin with "ftp://" or "ftps://" rather than HTML delimiters. Hence, example intended to aid the user can lead ultimately lead to more confusion.

On the other hand, other solutions break the complex data type into its individual components and provide an entry field for each of these components. Thus, instead of having a single form field, the UI will display several entry fields, e.g., one for each "Name", "Street address", "Apt.", "City", "State", and "Zip code". This solution does generally help the novice user input the data, given that user does not have to remember the correct order of the elements or the proper formatting such as the expected delimiters and so forth.

However, this second solution introduces several difficulties for the experienced user. Foremost, the experienced user can no longer enter data as efficiently since he or she makes added keystrokes or gestures to switch between form fields, and has lost the ability to cut and paste the entire string. Secondly, the UI is now more complex or cluttered with additional items that are not desired by the experienced user, which can lead to additional inefficiencies such as navigation of additional screens and so forth. Furthermore, in cases where the entered data depends on various factors, this approach suffers from the same shortcomings as the first solution (e.g., displaying an example) in that the actual constituent fields can vary, thereby requiring many combinations of examples or constituent fields. For another example, the input might be more compact in its complex format or string representation and thus easier for an expert to type directly. Ultimately, going from field to field may be more tedious to the experienced user.

The above-described deficiencies of today's techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In one or more embodiments, the disclosed subject matter can relate to an architecture that can facilitate a configurable multi-view for data entry. In accordance therewith, the architecture can include an expander component that can be configured to display an input window on a user interface (UI) when the UI includes a form field associated with a complex data type. The displayed input window can include multiple constituent fields associated with portions of the complex data type. For example, the complex data type can be a composite of multiple individual elements of data, and each such element can therefore be a constituent field of the complex data type.

In addition, the architecture can further include a synthesis component that can be configured to display in real-time correctly formatted inline updates to the form field or to the input window based upon data entry input received by the UI. For instance, if the data entry input received by the UI is provided to the form field, then the synthesis component can update associated constituent fields. On the other hand, if the data entry input received by the UI is provided to the constituent fields of the input window, then the synthesis component can update the form field according to the expected format.

These and other embodiments are described in more detail below.

BRIEF DESCRIPTION OF THE DRAWINGS

The system and methods are further described with reference to the accompanying drawings in which:

FIG. 3 illustrates a block diagram of an exemplary graphical illustration that depicts a progression of the UI over time in connection with the disclosed subject matter;

FIGS. 6-8 various graphical depictions illustrating the evolution of features described herein as presented to a user;

DETAILED DESCRIPTION

Overview

By way of an introduction, the subject matter disclosed herein relates to various embodiments to facilitate a more robust, efficient, and/or convenient manner to input information to a single form field that expects complex (or compound) data types (or formats). One or more embodiments can provide a mechanism for configurable multi-view data entry. For example, when a user encounters a form field with a complex data type, depending on the invoking mechanism selected, either automatic, when on focus, or through a user gesture such as clicking on an icon in or near the form field, the form field expands to multiple form fields including the original form field.

These multiple constituent form fields can enable the user to enter each separate data element that composes the complex data type into the constituent fields. As the data elements are entered into constituent fields, the disclosed subject matter can combine those data into a correct format, and display the correct format in the original form field. Advantageously, the inverse approach is also possible. For example, data can be directly input to the original form field (in the complex data type/format) and the constituent form fields can be populated with appropriate data elements. Accordingly, users can be provided instant aid when useful, while the UI is not cluttered or less efficient when such is not useful. Moreover, users do not sacrifice productivity since the single form field remains available for input, and have the further ability to verify items about which there remains some uncertainty. Furthermore, advanced users can be afforded the ability to input data (e.g., via the form field) that is not available by default in the constituent fields, which provides an additional level of security. In addition, by displaying the completed, correctly formatted data in the form field when the constituent fields are populated, the user gains insight into the data entry process, and is provided the ability to copy the data from the form field and store it for rapid copying to the form field, without being required to navigate multiple constituent fields.

Configurable Multi-View Data Entry

Figure 1:
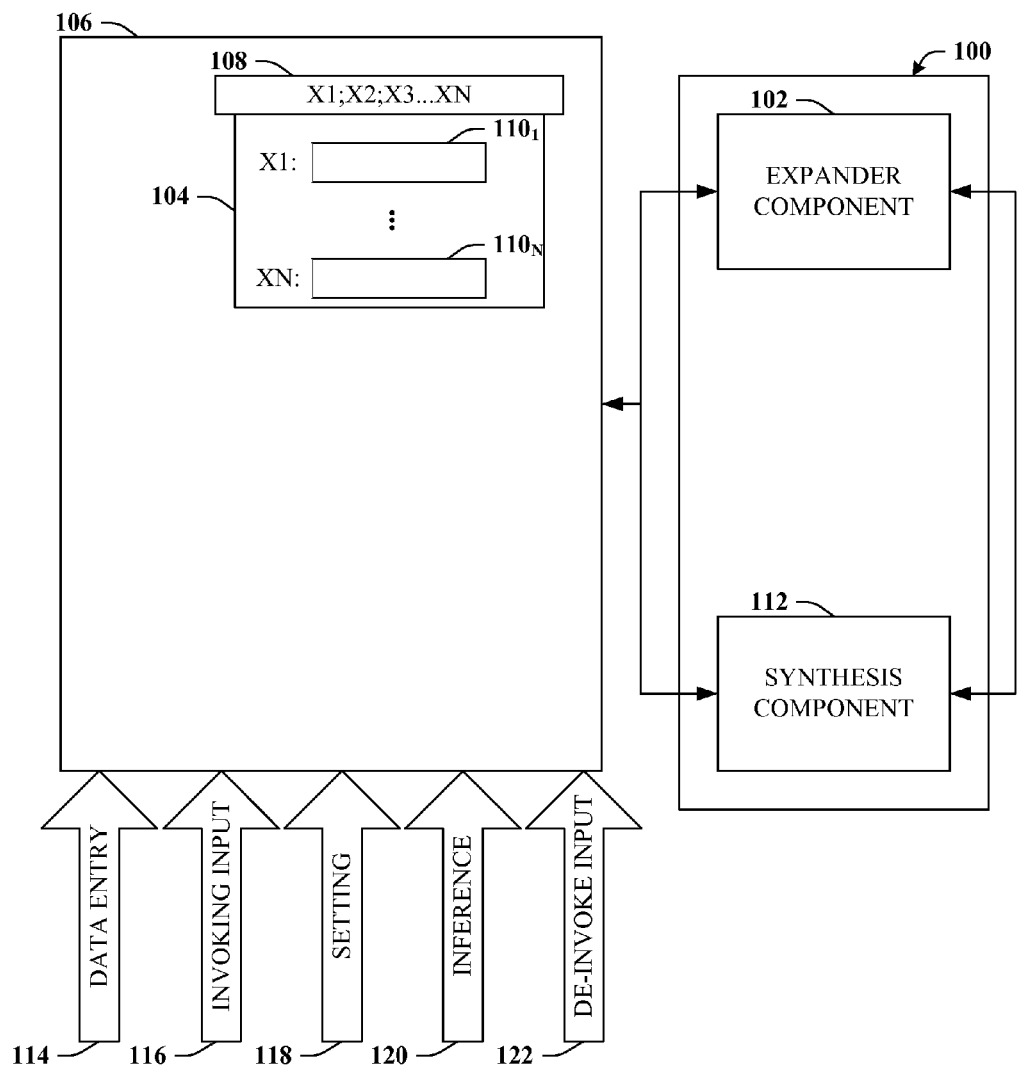
FIG. 1 illustrates a block diagram of an exemplary non-limiting system that can facilitate configurable multi-view data entry.

Referring now to the drawings, with reference initially to FIG. 1, system 100 that can facilitate configurable multi-view data entry is depicted. Generally, system 100 can include expander component 102 that can be configured to display input window 104 on user interface (UI) 106. In more detail, UI 106 can be substantially any UI associated with, e.g., a database, a browser, or another application or device. UI 106 can include form field 108 associated with a compound and/or complex data type, while input window 104 can include multiple constituent fields $110_1$-$110_N$ associated with portions of the compound data type. It is understood that constituent fields $110_1$-$110_N$, where N can be substantially any positive integer, can be referred to herein, either collectively or individually as constituent field(s) 110, with appropriate subscripts employed generally only when instructive or convenient to highlight various distinctions or to impart the disclosed concepts.

In one or more embodiment, a compound data type is a formatted or delimited composition of multiple data subtypes. Data subtypes can be simple data types that relate to single data elements associated with the multiple constituent fields 110. Additionally or alternatively, in one or more embodiment, compound data types can be composed of other compound data types (or combinations of other compound data types and simple data types) such that constituent fields 110 can be displayed in input window 104 in a nested or hierarchical fashion. For example, compound data type can relate to contact information organized as a monolithic single field comprising address and phone number of the contact. Both subtypes (address and phone number) can be further decomposed into constituent parts. For address: street address, city, state, zip code; and for phone number: international code, area code, prefix, and number.

Thus, as depicted, form field 108 expects data to be entered according to a composite of several individual data items (e.g., X1, X2, . . . XN), not necessarily in any particular order (as parsing and other mechanisms or intelligence can derive the proper fields), but delimited by semicolons. Hence, various individual data items are expanded to associated individual constituent fields 110 in input window 104 to, e.g., aid in or provide insight into properly entering data.

In addition, system 100 can further include synthesis component 112 that can be, as with other components described herein, embodied in a computer-readable storage medium. Synthesis component 112 can be configured to display in real-time correctly formatted inline updates to form field 108 or to input window 104 based upon data entry input 114 to UI 106. For example, data entry input 114 characterized as data entered into a constituent field 110, can result in synthesis component 112 populating form field 108 with the appropriate, correctly formatted data. As one result, users can observe how constituent elements combine to yield the compound data type, as well as gain insight into other formatting features associated with the compound data type. Conversely, data entry input 114 characterized as data entered into form field 108 can result in synthesis component 112 populating the appropriate constituent field(s) 110. As a result, users can decompose the complex data type, which can also be instructive in a number of ways. It is understood that correctly formatted inline updates can relate to a format enforced or expected, including, e.g., a correct order of constituent elements (optional) or a correct use of delimiters or the like.

Furthermore, in addition to displaying input window 104, expander component 102 can also be configured to display input window 104 based upon invoking input 116 received by UI 106. By way of illustration, invoking input 116 can be based upon a keystroke or a cursor focus from a mouse or other pointing device. Additionally or alternatively, invoking input 116 can be based upon selection or clicking of an icon or other element included in UI 116, or substantially any other suitable gesture or input.

Moreover, in some scenarios, expander component 102 can be configured to display input window 104 automatically, e.g., automatically display input window 104 in response to display of form field 108. Likewise, expander component 102 can be configured to only display input window 104 based upon invoking input 116, while in other cases, to employ combinations thereof. For instance, various setting can be employed and/or various determinations or inferences can be made based upon, for example, the level of skill of a user, the type of form field 108, and so forth. Thus, expander component 102 can be further configured to display input window 104 based upon setting 118. Setting 118 can be a default setting or a configurable setting. Furthermore, expander component 102 can be further configured to display input window 104 based upon inference 120, which is further detailed infra in connection with FIG. 4.

In addition, in one or more embodiment, expander component 102 can be further configured to remove or hide input window 104. Such can be accomplished by way of de-invoking input 122 or by another means. It is understood that de-invoking input 122 can be based upon substantially any gesture or system command as well as based upon setting 118 or inference 120, similar to that of invoking input 116. For example, expander component 102 can hide or remove input window 104 based upon completion of data entry input 114, expiration of a time interval after completion of data entry input 114, a period of inactivity, or so forth.

As indicated previously, synthesis component 112 can provide correctly formatted inline updates in real-time based upon data entry input 114. In one or more embodiment, synthesis component 112 can be further configured to display correctly formatted inline updates as data entry input 114 is received. Likewise, in one or more embodiment, synthesis component 112 can be further configured to display correctly formatted inline updates prior to completion of data entry input 114 or a portion thereof. In accordance with the above, synthesis component 112 can, e.g., populate various portions of input window 104 (e.g., when data entry input 114 is associated with form field 108) or form field 108 (e.g., when data entry input 114 is associated with input window 104) after completion of input of each delimited data element. However, in other configurations, synthesis component 112 can populate various portions of input window 104 or form field 108 after some or all individual keystrokes or other character or data inputs. In any case, further updates to one of input window 104 or form field 108 can result in updates to the other, potentially including corrections to potential errors resulting in a lack of full data representation.

Figure 2:
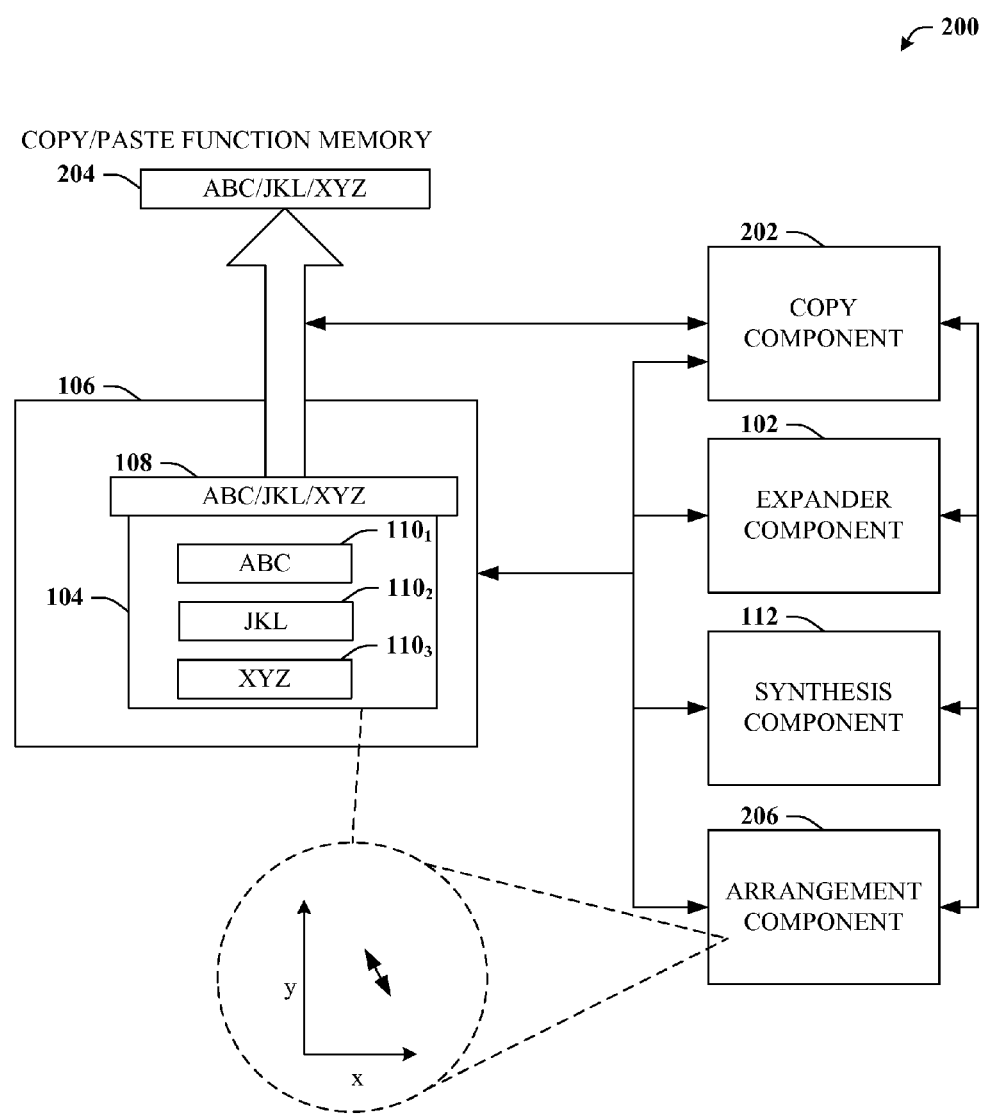
FIG. 2 illustrates a block diagram of an exemplary non-limiting system that can provide additional features in connection with a configurable multi-view data entry.

Turning now to FIG. 2, system 200 that can provide additional features in connection with a configurable multi-view data entry is illustrated. System 200 can include expander component 102 that can display input window 104 comprising multiple constituent fields 110 as substantially described supra in connection with FIG. 1. System 200 can also include synthesis component 112 that can display in real-time correctly formatted inline updates to form field 108 or input window 104 as described previously.

In addition, system 200 can include copy component 202 that can automatically store the compound data type displayed in form field 108 to memory buffer 204 associated with a copy/paste function, such as an automatic save to a clipboard some time after data entry input 114 and/or the compound data type is complete and correct. As noted previously, experienced users can maintain records of various compound data types that can be quickly copied and pasted into form field 108 in an efficient manner. Thus, e.g., when the experienced user is entering a new compound data type and/or one he or she is not familiar with by way of input window 104, the final result can be automatically stored to the clipboard. Such can enable the user to paste the compound data type to his or her record, thereby saving keystrokes or gestures over manually saving the compound data type to the clipboard or other memory buffer 204. In addition, in some aspects, copy component 202 can be configured to automatically save the compound data type directly to a designated record or file.

Furthermore, system 200 can also include arrangement component 206 that can be configured to determine at least one of a size of input window 104 or a location of input window 104 based upon at least one of a layout associated with UI 106 (e.g., size, shape, or location of other elements or objects), a number or location of one or more other form fields or other input windows, a number of constituent fields 110 included in input window 104, a form factor associated with UI 106, or the like. Further detail with respect to arrangement component 206 can be found with reference to FIG. 4.

With reference now to FIG. 3, graphical illustration 300 that depicts a progression over time of the disclosed subject matter. As illustrated, initially at what is denoted phase 1, UI 106 can present form field 108 that is associated with a compound data type at some location within a display component (e.g., screen or window) of UI 106. Thus, UI 106 can be presented in a streamlined fashion, enabling efficient data entry input 114 directly to form field 108, e.g., by experienced users or the like, while also retaining the capability to display further detail, e.g., for novice users who want aid to enter suitable data into form field 108.

In particular, at phase 2, either automatically or based on invoking input 116, expander component 102 can display input window 104. Whether input window 104 is display automatically or due to invoking input 116, such can potentially rely on setting 118 or inference 120. For example, in some scenarios input window 104 can be display automatically based upon setting 118 or inference 120, while in the same or other scenarios input window 104 can be displayed only after invoking input 116 is received. Input widow 104 can include multiple constituent fields 110 that combine to yield compound data expected in form field 108.

Thus, at phase 3, as data entry input 114 is received at either form field 108 or within any of the multiple constituent fields 110, synthesis component 112 can display in real-time correctly formatted inline updates. Hence, the depicted string in form field 108 can be a result of inputting associated data into constituent fields 110, or directly into form field 108, in which case constituent fields 110 are populated with suitable data. In either case, synthesis component can correctly format data entry input, e.g., by correctly ordering (if necessary) and adding delimiters (e.g., "/") to form field 108 or by ignoring delimiters in constituent fields 110, yet maintaining any required correct ordering, and possibly providing suitable field labels.

At optional phase 4, data entry input 114 provided to form field 108 (e.g., by an experienced user) can include information not listed in default or standard display of input window 104, which can be parsed and result in display of additional constituent fields (e.g., constituent field $110_3$ based upon addition of the "PQR" data). Accordingly, not all constituent fields 110 that are displayed in alternate embodiments, even when such fields are available. Such can be beneficial in that input window 104 remains compact, and can also be beneficial because it does not expose all the underlying structure of the compound data type. For example, consider the case in which the "PQR" portion of the compound data type is an optional field that enables administrative privileges. Experienced administrators can use this string to gain a particular type of access, whereas a novice user need not even be aware of its existence.

Last to be described, at optional phase 5, expander component 102 can remove or hide input window 104 (either automatically or based upon de-invoking input 122), which can result in a cleaner, less cluttered UI 106.

Figure 4:
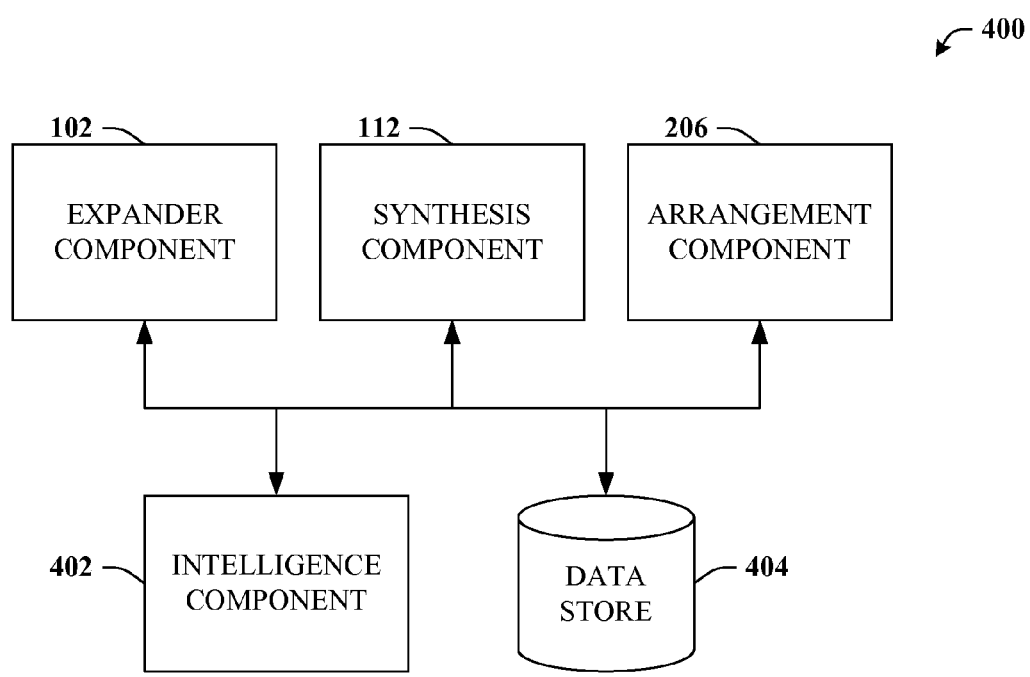
FIG. 4 is block diagram of an exemplary system that can provide for or aid with various inferences.

Now referring to FIG. 4, system 400 that can provide for or aid with various inferences is depicted. System 400 can include expander component 102, synthesis component 112, and arrangement component 206 as substantially described supra. As introduced above, such components (or other components) can generate intelligent determinations or inferences, which can be based on Bayesian probabilities or confidence measures. Such techniques can be employed be based upon machine learning techniques related to historical analysis, feedback, and/or previous determinations or inferences. For example, expander component 102 can intelligently determine or infer if input window 104 is to be displayed, utilizing, e.g., various settings or configurations as well as other indicators such as login ID (experienced user or novice user), recent activity and so on. Likewise, synthesis component 112 can intelligently determine or infer proper ordering and delimiter use in connection with data entry input 114. Moreover, arrangement component 206 can intelligently determine or infer a suitable size, shape, or position for input window 104 based upon, e.g., pre-existing UI 106 layout.

In addition, system 400 can further include intelligence component 402 that can provide for or aid in various inferences or determinations. In particular, intelligence component can be configured to construct inference 120. Moreover, in accordance with or in addition to what has been described supra with respect to intelligent determinations or inferences provided by various components described herein, intelligence component 402 can aid these components in such intelligent determinations or inferences. Additionally or alternatively, all or portions of intelligence component 402 can be included in one or more components described herein. Thus, intelligence component 402 can reside in whole or in part within expander component 102, synthesis component 112, arrangement component 206, or other components detailed herein. Moreover, intelligence component 402 will typically have access to all or portions of data sets, preferences, or histories described herein, which can be stored and or accessed by way of data store 404.

It is appreciated that data store 404 is intended to be a repository of all or portions of data, data sets, or information described herein or otherwise suitable for use with the described subject matter. Data store 404 can be centralized, either remotely or locally cached, or distributed, potentially across multiple devices and/or schemas. Furthermore, data store 404 can be embodied as substantially any type of memory, including but not limited to volatile or non-volatile, sequential access, structured access, or random access, solid state, and so on. It is understood that all or portions of data store 404 can be included in system 100 (or other systems disclosed herein), or can reside in part or entirely remotely from system 100.

In more detail, in order to provide for or aid in the numerous inferences described herein, intelligence component 402 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inferences can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events, e.g., a trigger. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 5:
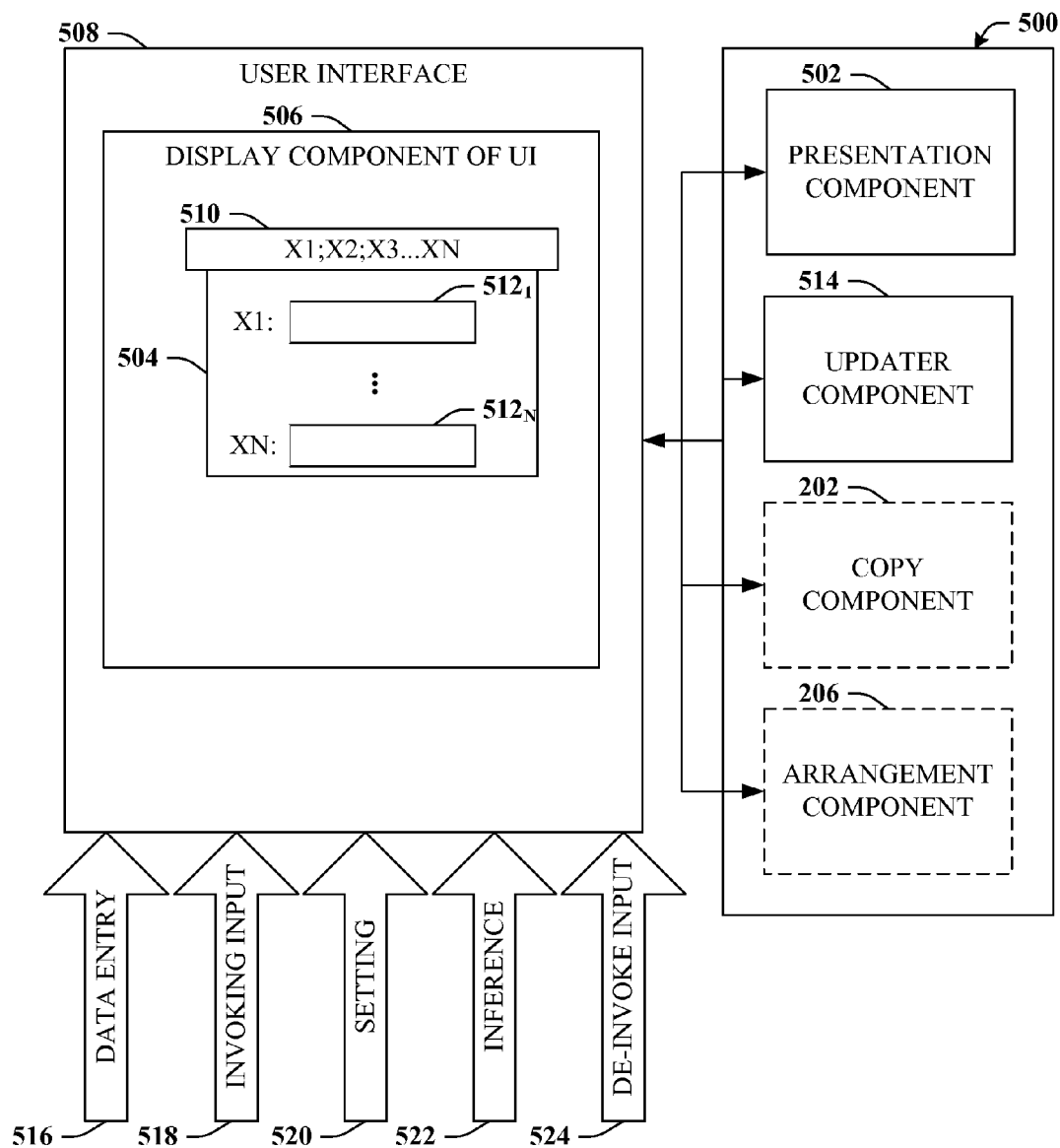
FIG. 5 is block diagram of an exemplary system that can facilitate configurable multi-view entry of connection strings.

Turning now to FIG. 5, system 500 that can facilitate configurable multi-view entry of connection strings is provided. In general, system 500 can include presentation component 502 that can be configured to present input window 504 to display component 506 of UI 508. In other words, display component 506 can be UI 508 or a subset of (e.g., a display portion) of UI 508. Regardless, display component 506 can include form field 510 associated with a connection string employed to connect an application to a data source over a communications network. The complex connection string can be a complex and/or compound data type as detailed above. Moreover, input window 504 that is presented by presentation component 502 can include multiple constituent fields 512$_1$-512$_N$, referred to herein either individually or collectively as constituent field(s) 512, that can be associated with portions of the complex connection string.

In addition, system 500 can include updater component 514 that can be embodied in a computer-readable storage medium and can be configured to present in real-time correctly formatted inline updates to form field 510 or input window 504 based upon data entry input 516. It is understood that presentation component 502 and updater component 514 can be substantially similar to expander component 102 and synthesis component 112, respectively, detailed in connection with FIGS. 1-4. Thus, all or a portion of features or aspects detailed in connection with expander component 102 and synthesis component 112, can apply to presentation component 502 and updater component 514 as well. However, one distinction can be that component 502 and updater component 514 can be specifically configured for use with form field 510 that expects a connection string rather than more general complex/compound data types.

Thus, in one or more embodiment, presentation component 502 can be further configured to display input window 504 based upon at least one of invoking input 518 (e.g., keystroke, mouse-click, or another gesture) received by UI 508, based upon automatic presentation (e.g., immediately and/or without a manual invoking input 518), based upon setting 520 or inference 522 (e.g., present input window 504 for some form fields 510 but not others, or for some users but not others, or automatically in some cases but only upon invocation for others).

Likewise, in one or more embodiment, updater component 514 can be further configured to present correctly formatted inline updates as data entry input 516 is received, or prior to completion of data entry input 516 or a portion thereof, as well as other real-time techniques. In addition, system 500 can optionally include copy component 202 configured to automatically store the complex connection string presented in form field 510 to a memory buffer associated with a copy/paste function or directly to a designated file, database, or record, as previously detailed in connection with FIG. 2. Moreover, system 500 can also optionally include arrangement component 206 configured to determine at least one of a layout associated with display component 506, a number or location of one or more other form fields or other input windows included in display component 506, a number of constituent field(s) 512, or a form factor associated with UI 508 and/or display component 506, which was also detailed in connection with FIG. 2.

While still referring to FIG. 5, but turning now as well to FIGS. 6-8, various graphical depictions illustrating the evolution of features described herein as presented to a user. For example, FIG. 6 provides graphical depiction 600 that illustrates a UI presenting a form field (e.g., form field 510), which is identified by reference numeral 602. Depending on the situation and/or the data format request, a decision can be made as to whether an expanded version of form field 510 (e.g., input window 504) is displayed automatically or based upon a UI gesture such as a button or pointer mechanism click. Regardless, FIG. 7 provides graphical depiction 700, illustrating input window 504 expanded from form field 510. In this case, a ghosted version of field labels are included in each of the constituent fields of input window 504.

At this point, a user now has the option to enter data into the individual constituent fields, wherein updater component 514 can compose the complex connection string in the correct data format. Additionally, the user also has the option to input data into form field 510. In the latter case, updater component 514 can parse such input and separate the individual data items into respective constituent fields 510 included in input window 504. Regardless, an example of a final result is depicted by graphical depiction 800 of FIG. 8.

In accordance with what has been described above, various advantageous features or embodiments become apparent. By employing the disclosed subject matter, both experienced users and novice users alike can complete a data entry field that requires a complex and/or compound data type comprising multiple constituent parts in a specified format, while reducing effort and mitigating potential confusion. For example, an experienced user who knows the correct data format can enter that data immediately in the complex form field. However, novice users who are not sure of the correct format can construct the complex data type by populating constituent forms in piecemeal fashion, each potentially including a label or other prompt to indicate the correct portion of data. Meanwhile, components disclosed herein can ensure the complex data type is constructed appropriately. In addition, the disclosed subject matter can provide the above, while maintaining a simple and uncluttered UI.

In addition, input window 504 can display only mandatory fields, but also handle optional fields. Thus, input window 504 does not unnecessarily add to the complexity of the UI, which might overwhelm a novice user. Furthermore, such a feature can help ensure that input window 504 does not expose various underlying concepts to a user, but can parse and display those underlying concepts when prompted. Moreover, while examples provided herein have been directed to complex data types such as addresses or connections strings, the disclosed subject matter is not so limited. Rather, substantially any type of compound data format that is input to a single form field can be employed. Moreover, constituent fields (e.g., 110 or 512) included in input windows (e.g., 104 or 504) are not limited to forms as depicted by several examples.

For example, the input window can be displayed as an orthographic map, with coordinates displayed on the axes. Thus, a form field with the complex data type that relates to, say, satellite coordinates, composed of a latitude and a longitude and delimited by a colon (e.g., 112.76:49.87) can employ suitable constituent fields. For instance, these constituent fields can be represented by sliders on the x- and y-axes. Hence, input to the form field can move the sliders, whereas input to the input window (e.g., manipulating the sliders) can update the textual data in the form field.

Figure 9:
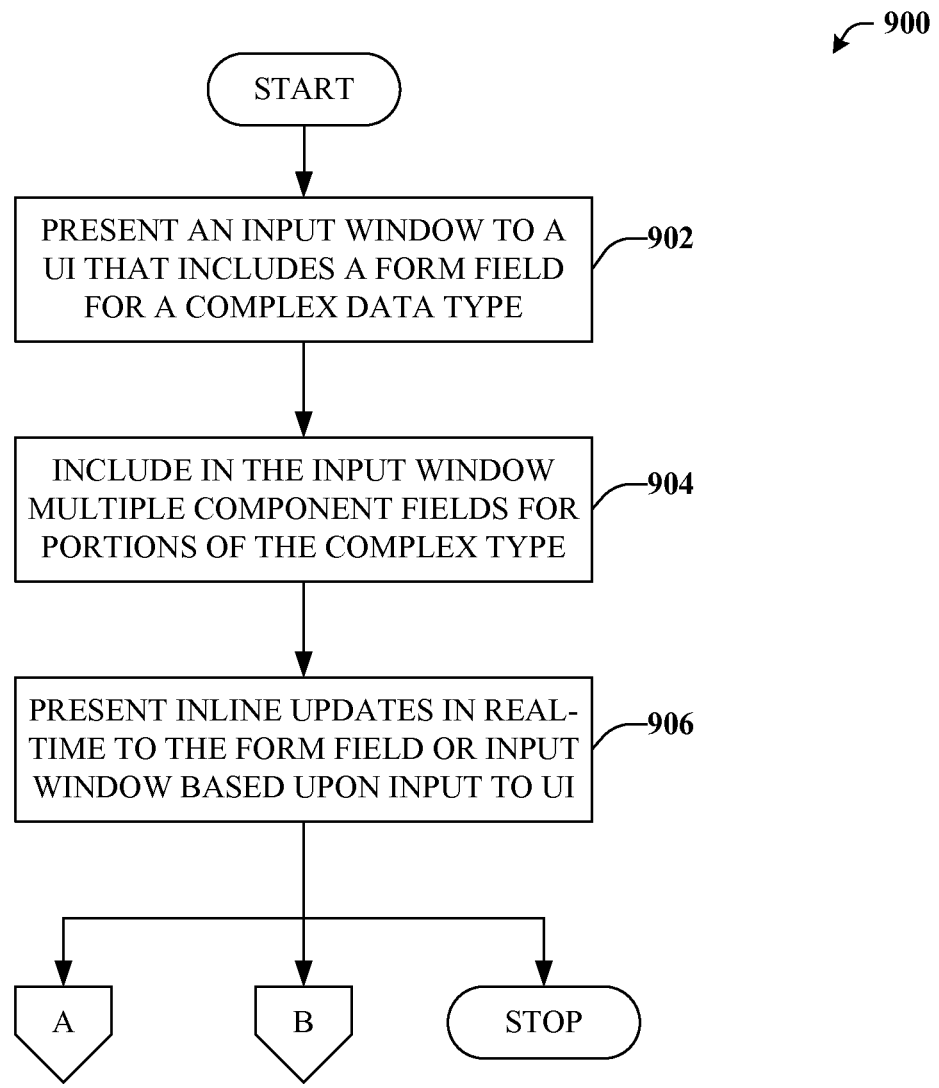
FIG. 9 is an exemplary non-limiting flow diagram for facilitating multi-view data entry.
Figure 10:
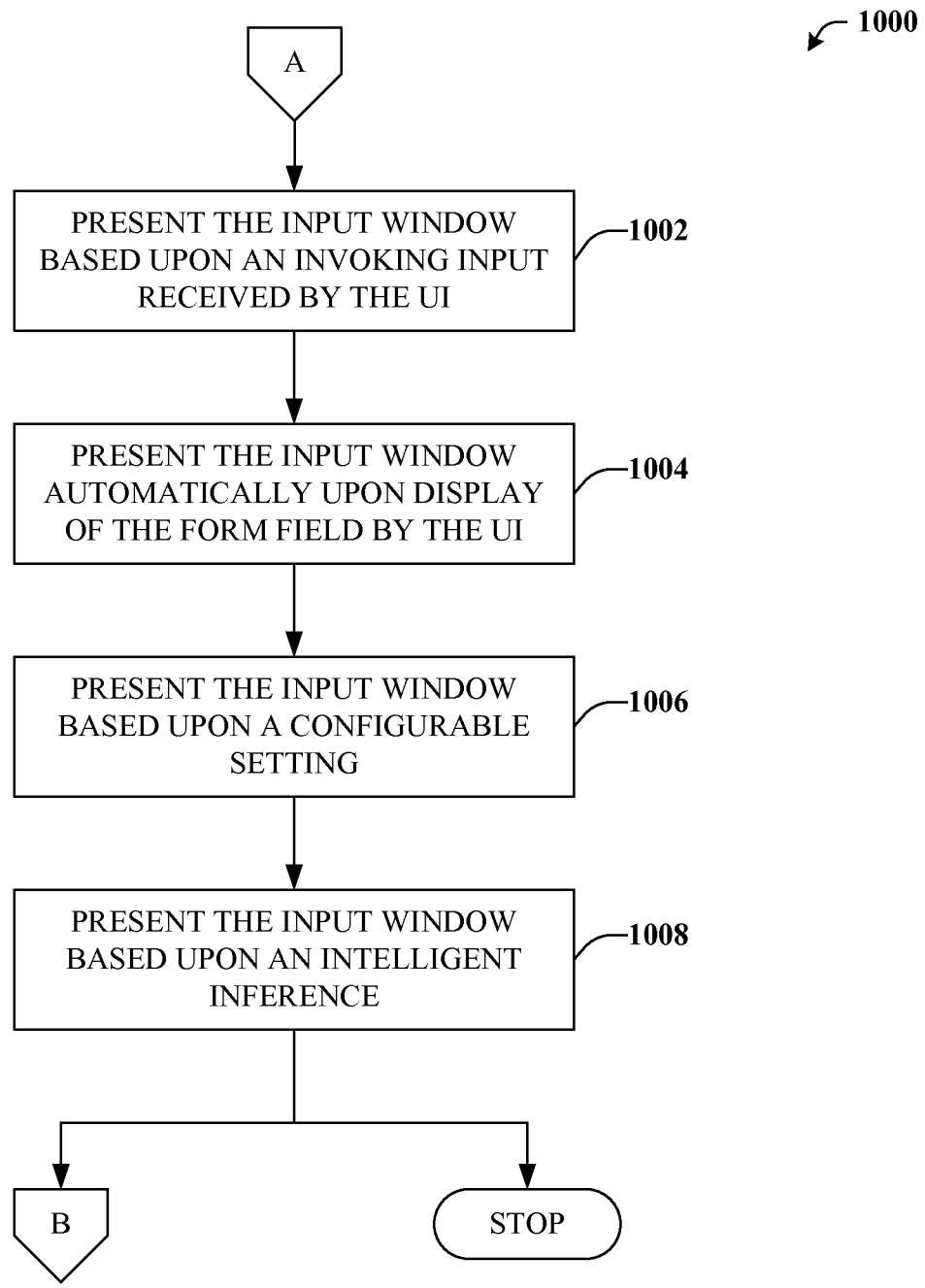
FIG. 10 is an exemplary non-limiting flow diagram for providing addition features or aspects in connection with presenting the input window.
Figure 11:
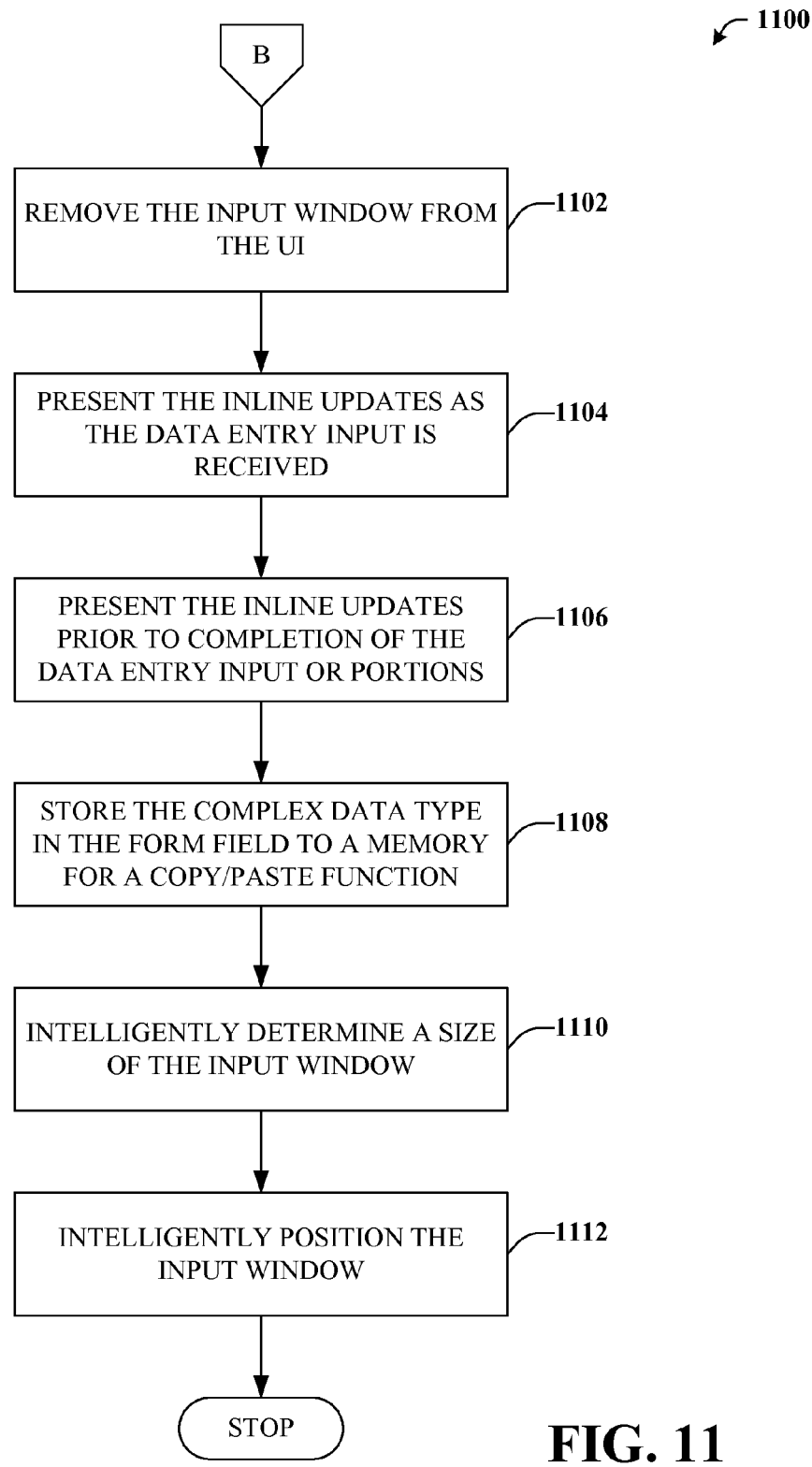
FIG. 11 is an exemplary non-limiting flow diagram for providing addition features or aspects in connection with facilitating multi-view data entry.

FIGS. 9-11 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be used to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers.

Referring now to FIG. 9, exemplary method 900 for facilitating multi-view data entry is depicted. Generally, at reference numeral 902, an input window can be presented to a user UI that includes a form field associated with a complex data type. Thus, for example, potentially any UI with a form field that expects multiple discreet data elements to be formatted as a single complex entry can be applicable. In such cases, the input window can then be presented.

Next to be described, at reference numeral 904, multiple component fields associated with individual portions of the complex data type can be included in the input window. Thus, at reference numeral 906, correctly formatted inline updates can be presented by the UI in real-time to the input window or to the form field based upon data entry input to the UI. For example, data entered to a component field can result in the form field to be updated, whereas data entered to the form field can result in updates to one or more of the component fields of the input window.

Turning now to FIG. 10, exemplary method 1000 for providing addition features or aspects in connection with presenting the input window is illustrated. At reference numeral 1002, the input window presented in connection with reference numeral 902 of FIG. 9 can be presented based upon an invoking input received by the UI. The invoking input can be a pointer focus, a pointer click or selection, a button activation, or substantially any suitable gesture.

Next to be described, at reference numeral 1004, the input window can be automatically presented, for example, upon display of the form field by the UI, or upon focus of the form field by a selection or pointing mechanism. In either case, whether presented based upon invoking input or automatically, the presentation of the input window can be based upon a configurable setting as indicated by reference numeral 1006. Likewise, at reference numeral 1008, the input window can be presented based upon an intelligent inference.

Referring to FIG. 11, exemplary method 1100 for providing addition features or aspects in connection with facilitating multi-view data entry is depicted. At reference numeral 1102, the input window can be removed from the UI. For example, the input window can be hidden or removed based upon, e.g., a de-invoking input to the UI, completion of the data entry input, expiration of a time interval after completion of the data entry input, a period of inactivity, or the like.

In addition, at reference numeral 1104, the correctly formatted inline updates presented in connection with reference numeral 906 of FIG. 9, can be presented as the data entry input is received. Likewise, at reference numeral 1106, the correctly formatted inline updates can be presented prior to completion of the data entry input or a portion thereof.

Furthermore, at reference numeral 1108 the complex data type extant in the form field can be stored to a memory associated with a copy and/or paste function. Thus, the complex data type can be readily pasted to a file or record for later access or recall. Additionally or alternatively, at reference numeral 1110, a size of the input window can be intelligently determined. Similarly, at reference numeral 1112, a position for the input window can be intelligently determined For example, a size of the input window or a position of the input window can be intelligently determined based upon at least one of a layout associated with the UI, a number or location of one or more other form fields or other input windows, a number of constituent fields, or a form factor associated with the UI.

Exemplary Networked and Distributed Environments

One of ordinary skill in the art can appreciate that the various embodiments of dynamic composition described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the smooth streaming mechanisms as described for various embodiments of the subject disclosure.

Figure 12:
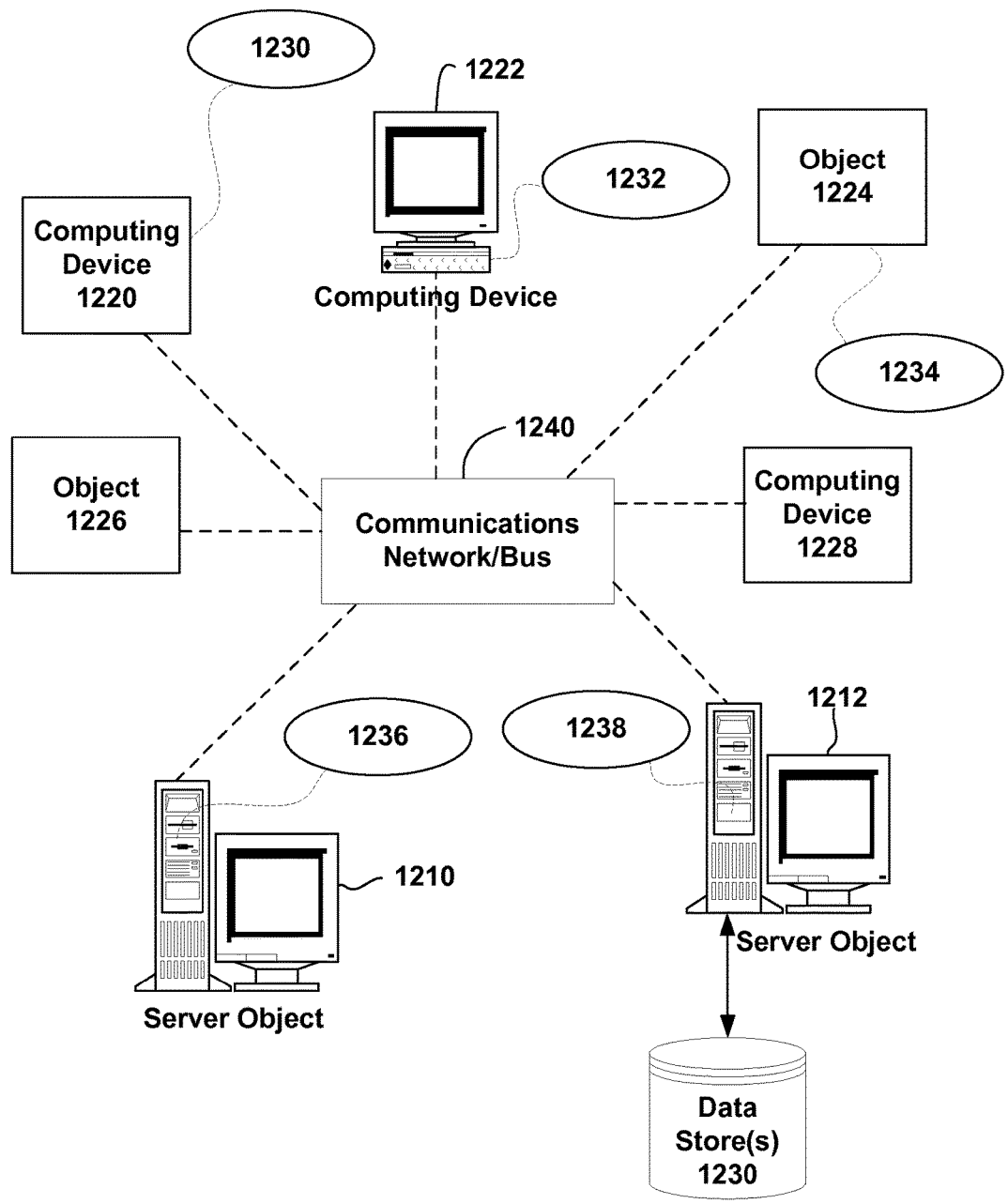
FIG. 12 is a block diagram representing an exemplary non-limiting networked environment in which the various embodiments may be implemented.

FIG. 12 provides a schematic diagram of an exemplary networked or distributed computing environment. The distributed computing environment comprises computing objects 1210, 1212, etc. and computing objects or devices 1220, 1222, 1224, 1226, 1228, etc., which may include programs, methods, data stores, programmable logic, etc., as represented by applications 1230, 1232, 1234, 1236, 1238. It can be appreciated that computing objects 1210, 1212, etc. and computing objects or devices 1220, 1222, 1224, 1226, 1228, etc. may comprise different devices, such as PDAs, audio/video devices, mobile phones, MP3 players, personal computers, laptops, etc.

Each computing object 1210, 1212, etc. and computing objects or devices 1220, 1222, 1224, 1226, 1228, etc. can communicate with one or more other computing objects 1210, 1212, etc. and computing objects or devices 1220, 1222, 1224, 1226, 1228, etc. by way of the communications network 1240, either directly or indirectly. Even though illustrated as a single element in FIG. 12, network 1240 may comprise other computing objects and computing devices that provide services to the system of FIG. 12, and/or may represent multiple interconnected networks, which are not shown. Each computing object 1210, 1212, etc. or computing objects or devices 1220, 1222, 1224, 1226, 1228, etc. can also contain an application, such as applications 1230, 1232, 1234, 1236, 1238, that might make use of an API, or other object, software, firmware and/or hardware, suitable for communication with or implementation of the smooth streaming provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the dynamic composition systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 12, as a non-limiting example, computing objects or devices 1220, 1222, 1224, 1226, 1228, etc. can be thought of as clients and computing objects 1210, 1212, etc. can be thought of as servers where computing objects 1210, 1212, etc. provide data services, such as receiving data from client computing objects or devices 1220, 1222, 1224, 1226, 1228, etc., storing of data, processing of data, transmitting data to client computing objects or devices 1220, 1222, 1224, 1226, 1228, etc., although any computer can be considered a client, a server, or both, depending on the circumstances. Any of these computing devices may be processing data, or requesting transaction services or tasks that may implicate the techniques for dynamic composition systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for performing read set validation or phantom checking can be provided standalone, or distributed across multiple computing devices or objects.

In a network environment in which the communications network/bus 1240 is the Internet, for example, the computing objects 1210, 1212, etc. can be Web servers with which the client computing objects or devices 1220, 1222, 1224, 1226, 1228, etc. communicate via any of a number of known protocols, such as the hypertext transfer protocol (HTTP). Computing objects 1210, 1212, etc. may also serve as client computing objects or devices 1220, 1222, 1224, 1226, 1228, etc., as may be characteristic of a distributed computing environment.

Exemplary Computing Device

As mentioned, advantageously, the techniques described herein can be applied to any device where it is desirable to perform dynamic composition. It is to be understood, therefore, that handheld, portable and other computing devices and computing objects of all kinds are contemplated for use in connection with the various embodiments, i.e., anywhere that a device may wish to read or write transactions from or to a data store. Accordingly, the below general purpose remote computer described below in FIG. 2 is but one example of a computing device. Additionally, a database server can include one or more aspects of the below general purpose computer, such as a media server or consuming device for the dynamic composition techniques, or other media management server components.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 13:
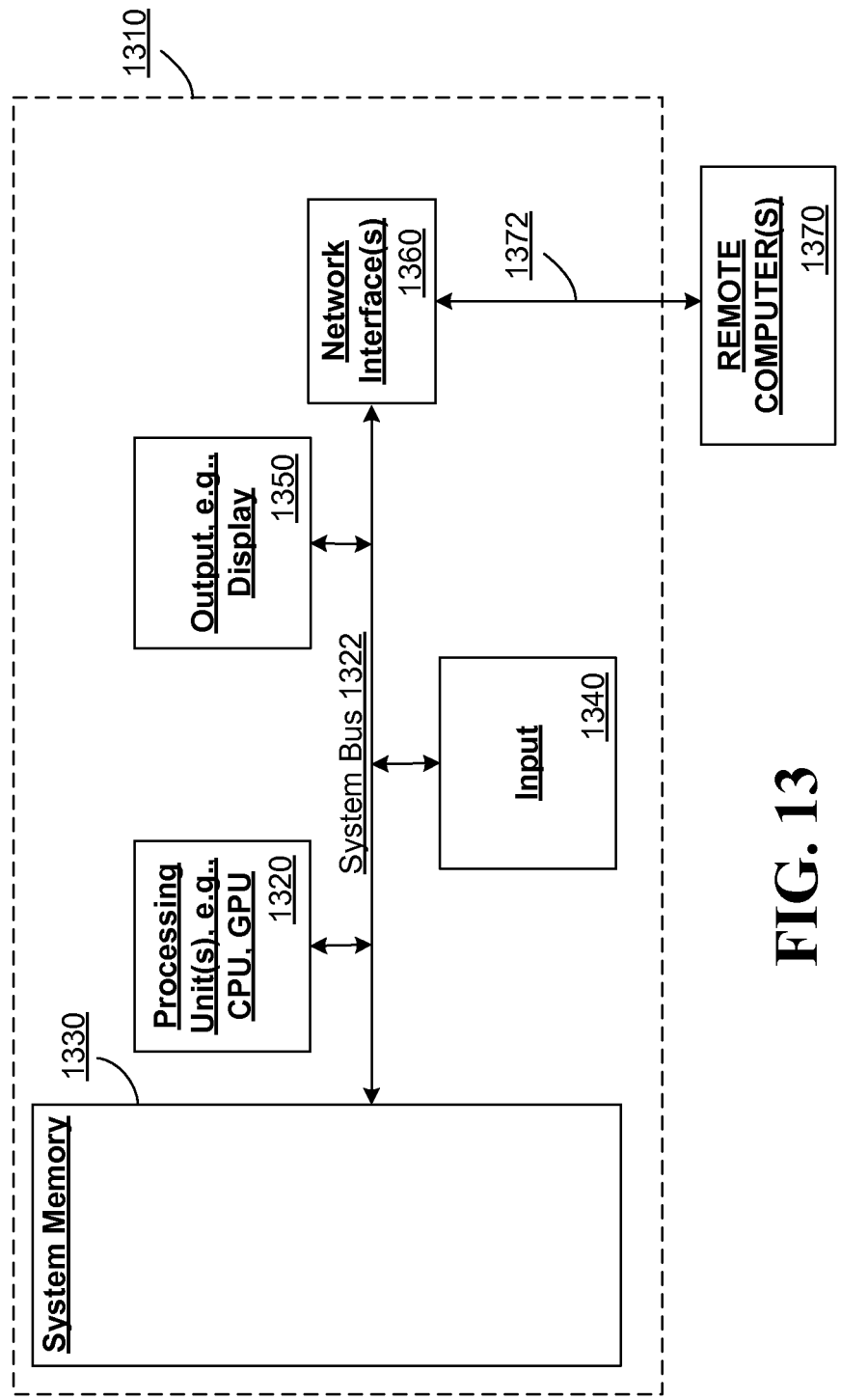
FIG. 13 is a block diagram representing an exemplary non-limiting computing system or operating environment in which the various embodiments may be implemented.

FIG. 13 thus illustrates an example of a suitable computing system environment 1300 in which one or aspects of the embodiments described herein can be implemented, although as made clear above, the computing system environment 1300 is only one example of a suitable computing environment and is not intended to suggest any limitation as to scope of use or functionality. Neither is the computing environment 1300 be interpreted as having any dependency or requirement relating to any one or combination of components illustrated in the exemplary operating environment 1300.

With reference to FIG. 13, an exemplary remote device for implementing one or more embodiments includes a general purpose computing device in the form of a computer 1310. Components of computer 1310 may include, but are not limited to, a processing unit 1320, a system memory 1330, and a system bus 1322 that couples various system components including the system memory to the processing unit 1320.

Computer 1310 typically includes a variety of computer readable media and can be any available media that can be accessed by computer 1310. The system memory 1330 may include computer storage media in the form of volatile and/or nonvolatile memory such as read only memory (ROM) and/or random access memory (RAM). By way of example, and not limitation, memory 1330 may also include an operating system, application programs, other program modules, and program data.

A user can enter commands and information into the computer 1310 through input devices 1340. A monitor or other type of display device is also connected to the system bus 1322 via an interface, such as output interface 1350. In addition to a monitor, computers can also include other peripheral output devices such as speakers and a printer, which may be connected through output interface 1350.

The computer 1310 may operate in a networked or distributed environment using logical connections to one or more other remote computers, such as remote computer 1370. The remote computer 1370 may be a personal computer, a server, a router, a network PC, a peer device or other common network node, or any other remote media consumption or transmission device, and may include any or all of the elements described above relative to the computer 1310. The logical connections depicted in FIG. 13 include a network 1372, such local area network (LAN) or a wide area network (WAN), but may also include other networks/buses.

Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the dynamic composition techniques. Thus, embodiments herein are contemplated from the standpoint of an API (or other software object), as well as from a software or hardware object that implements one or more aspects of the smooth streaming described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be used to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system, comprising:
an expander component configured to display, via at least one computing device, an input window that includes a form field, the form field displaying a compound data type in a formatted or delimited composition, the compound data type including multiple data components, the input window includes multiple constituent fields, each constituent field associated with a select data component of the compound data type;
a user interface (UI) configured to receive, via at least one computing device, data entry input into each of the constituent fields; and
a synthesis component configured to display, in real-time, via at least one computing device, correctly formatted inline updates to the form field, or to the input window, based upon the data entry inputs received by the UI, so that the form field displays the compound data type in accordance with the formatted or delimited composition;
wherein the expander component is configured to display the input window based upon at least one of invoking input received by the UI, automatic presentation, or an inference.

2. The system of claim 1, wherein the compound data type is a formatted or delimited composition of multiple data subtypes.

3. The system of claim 2, wherein the multiple data subtypes are at least one of simple data types that relate to single data elements associated with the multiple constituent fields, compound data types, or a combination of single data elements and compound data types.

4. The system of claim 1, wherein the expander component is further configured to display the input window based upon a setting.

5. The system of claim 1, wherein the expander component is further configured to display the input window based upon an inference.

6. The system of claim 1, wherein the expander component is further configured to remove or hide the input window based upon at least one of a de-invoking input to the UI, completion of the data entry input, expiration of a time interval after completion of the data entry input, or a period of inactivity.

7. The system of claim 1, wherein the synthesis component is further configured to display correctly formatted inline updates as the data entry input is received.

8. The system of claim 1, wherein the synthesis component is further configured to display correctly formatted inline updates prior to completion of the data entry input or a portion thereof.

9. The system of claim 1, further comprising a copy component configured to store, via at least one computing device, the compound data type displayed in the form field to a memory buffer associated with a copy/paste function.

10. The system of claim 1, further comprising an arrangement component configured to determine, via at least one computing device, at least one of a size of the input window or a location of the input window based upon at least one of a layout associated with the UI, a number or location of one or more other form fields or other input windows, a number of constituent fields, or a form factor associated with the UI.

11. A system, comprising:
a processor;
a presentation component configured to present, via the processor, an input window to a display component of a user interface (UI) of a device that includes a form field associated with a complex connection string employed to connect an application to a data source over a communications network, wherein the input window includes multiple constituent fields associated with portions of the complex connection string, wherein the complex connection string is displayed in accordance with a formatted or delimited composition; and
an updater component configured to present in real-time, via the processor, correctly formatted inline updates to the form field or the input window based upon data entry input received by the UI so that the complex connection string is displayed in accordance with the formatted or delimited composition;
wherein the presentation component displays the input window based upon at least one of invoking input received by at least one of the UI, automatic presentation, or an inference.

12. The system of claim 11, wherein the presentation component is further configured to display the input window based upon a setting.

13. The system of claim 11, wherein the updater component is further configured to present correctly formatted inline updates at least one of as data entry input is received, or prior to completion of the data entry input or a portion of the data entry input.

14. The system of claim 11, further comprising a copy component configured to store the complex connection string presented in the form field to a memory buffer associated with a copy or paste function.

15. The system of claim 11, further comprising an arrangement component configured to determine at least one of a size of the input window or a location of the input window based on at least one of a layout associated with the presentation component, a number or location of one or more other form fields or other input windows included in the display component, a number of constituent fields, a form factor associated with the presentation component, a form factor associated with the device, or the UI.

16. A method for facilitating multi-view data entry, comprising:
displaying an input component via a user interface (UI) that includes a form field for a complex data type, the complex data type including multiple individual portions, the form field associated with a formatted or delimited composition;
displaying, in the input component, multiple component fields associated with the individual portions of the complex data type;
receiving through the UI input data in at least one of the component fields; and
presenting correctly formatted inline updates in real-time to at least one of the form field or the input component based upon input data received by the UI;
wherein the displaying includes at least one of:
displaying the input component in response to the input data received by the UI;
displaying the input component in response to the display of the form field by the UI; or
displaying the input component based upon an inference.

17. The method of claim 16, wherein the displaying includes
displaying the input component based upon a configurable setting.

18. The method of claim 16, further comprising at least one of:

removing the input component from the UI;
displaying correctly formatted inline updates as the data entry input is received;
displaying the correctly formatted inline updates prior to completion of the input data or a portion of the input data;
storing the complex data type in the form field to a memory associated with a copy or paste function;
determining a size of the input component according to a first analysis; or determining a position for the input component according to a second analysis.

* * * * *